United States Patent [19]

McKenney et al.

[11] Patent Number: 5,948,157
[45] Date of Patent: *Sep. 7, 1999

[54] SURFACE TREATED ADDITIVE FOR PORTLAND CEMENT CONCRETE

[75] Inventors: Colin J. McKenney; Mikhail Pildysh; Donald J. Shyluk, all of Calgary, Canada

[73] Assignee: Fording Coal Limited, Alberta, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,088

[22] Filed: Dec. 10, 1996

[51] Int. Cl.$^6$ ........................... C04B 14/04; C04B 14/38
[52] U.S. Cl. .................... 106/711; 106/724; 106/727; 106/808; 106/822; 106/823
[58] Field of Search ..................... 106/724, 727, 106/783, 819, 822, 823, 808, 600, 603, 630, 711, 544

[56] References Cited

U.S. PATENT DOCUMENTS

| | | |
|---|---|---|
| 1,601,295 | 9/1926 | Collings . |
| 2,336,723 | 12/1943 | Drummond . |
| 2,443,081 | 6/1948 | Rapp et al. . |
| 2,556,156 | 6/1951 | Avery . |
| 2,695,850 | 11/1954 | Lorenz . |
| 2,760,876 | 8/1956 | Schulman . |
| 2,835,602 | 5/1958 | Benner . |
| 2,876,123 | 3/1959 | Drummond . |
| 3,021,225 | 2/1962 | Ziak . |
| 3,139,351 | 6/1964 | Hammer . |
| 3,335,081 | 8/1967 | Peeler, Jr. et al. . |
| 3,590,018 | 6/1971 | Gebura . |
| 3,902,911 | 9/1975 | Messenger . |
| 3,954,490 | 5/1976 | Cockram . |
| 4,013,478 | 3/1977 | Meyer . |
| 4,015,994 | 4/1977 | Hill . |
| 4,017,322 | 4/1977 | Kawai et al. ............................ 427/401 |
| 4,050,948 | 9/1977 | Gandy et al. . |
| 4,062,690 | 12/1977 | Litherland et al. . |
| 4,072,534 | 2/1978 | Ryder . |
| 4,090,883 | 5/1978 | Rauschenfels . |
| 4,095,995 | 6/1978 | Ullrich . |
| 4,101,334 | 7/1978 | Hill et al. . |
| 4,137,088 | 1/1979 | Debus et al. . |
| 4,170,564 | 10/1979 | Brendle ..................... 252/68 |
| 4,229,225 | 10/1980 | Kraszewski et al. . |
| 4,230,502 | 10/1980 | Lustig et al. . |
| 4,256,501 | 3/1981 | Banino .................. 428/403 |
| 4,293,343 | 10/1981 | Shannon . |
| 4,341,824 | 7/1982 | LeGrand ................. 428/15 |
| 4,371,399 | 2/1983 | May et al. . |
| 4,402,749 | 9/1983 | Hall et al. . |
| 4,455,170 | 6/1984 | LeGrand et al. ............ 428/404 |
| 4,473,406 | 9/1984 | Bradley et al. . |
| 4,478,640 | 10/1984 | Holland . |
| 4,482,379 | 11/1984 | Dibrell et al. . |
| 4,501,830 | 2/1985 | Miller ................. 523/401 |
| 4,619,775 | 10/1986 | Steltenkamp et al. .......... 252/8.8 |
| 4,655,837 | 4/1987 | Jong . |
| 4,657,959 | 4/1987 | Bryan et al. ............... 524/266 |
| 4,753,679 | 6/1988 | Damiano et al. . |
| 4,760,465 | 7/1988 | Arfari ..................... 106/724 |
| 4,792,360 | 12/1988 | Pierce et al. . |
| 4,814,014 | 3/1989 | Arfaei ..................... 524/5 |

(List continued on next page.)

FOREIGN PATENT DOCUMENTS

| | | |
|---|---|---|
| 335732 | 9/1933 | Canada . |
| 953316 | 8/1974 | Canada . |
| 1016194 | 8/1977 | Canada . |
| 1018191 | 9/1977 | Canada . |
| 1254588 | 5/1989 | Canada . |
| 2006793 | 6/1990 | Canada . |
| 2102900 | 11/1992 | Canada . |
| 0353062A3 | 1/1990 | European Pat. Off. . |
| 736556 | 10/1996 | European Pat. Off. . |
| 2252310 | 6/1975 | France . |
| 4325797 | 2/1995 | Germany . |
| 63-123847 | 5/1988 | Japan . |

OTHER PUBLICATIONS

Elavatorski, E.A., "Wollastonite", *Industrial Minerals and Rocks*, 5th ed., 1983, AIME, N.Y., pp. 1383–1390. (No month available).

Interpace Corporation Pamphlet, "Wollastonite—The versatile mineral filler for better products," updated, pp. 1–15.

Interpace Corporation, "U.S. Price List—Wollastonite," (Jan. 15, 1970) (3 pages).

Interpace Corporation, "Industrial Minerals Information—Data Sheet—Interpace Wollastonite," undated, (2 pages).

Bauer, R.R. et al., "Wollastonite," *Industrial Minerals and Rocks*, 6th ed. (1994) pp. 1119–1128. (No month available).

Hansson, C.M., "Concrete: The Advanced Industrial Material of the 21st Century," *Metallurgical and Materials Transactions A*, vol. 26A, (Jun. 1995) pp. 1321–1341.

(List continued on next page.)

*Primary Examiner*—Paul Marcantoni
*Attorney, Agent, or Firm*—Rodman & Rodman

[57] ABSTRACT

The invention is directed at an additive for incorporation into a cementitious compound comprising Portland cement and water prior to the setting of the compound. The additive is comprised of a surface treated additive wherein the surfaces of the additive are treated with a substance which has a transient hydrophobic effect on the additive, which effect temporarily renders the additive more hydrophobic for a time period following the incorporation of the additive into the compound such that the water comprising the compound is less attracted to the additive during the placement of the compound and is thus available to provide workability to the compound, and such that the additive regains its natural properties following placement of the compound in order to permit the additive to participate with the compound during the curing of the compound. The invention is also directed at a process for preparing the additive and a process for preparing a cementitious compound comprised of the additive.

32 Claims, No Drawings

U.S. PATENT DOCUMENTS

| | | |
|---|---|---|
| 4,827,028 | 5/1989 | Scardera et al. .......................... 562/583 |
| 4,888,058 | 12/1989 | Rosenberg et al. . |
| 4,895,598 | 1/1990 | Hedberg et al. . |
| 4,940,770 | 7/1990 | Sperazza et al. .......................... 528/11 |
| 5,085,694 | 2/1992 | Cifuentes ..................................... 106/3 |
| 5,348,578 | 9/1994 | Le Disert et al. .................... 106/287.2 |
| 5,429,675 | 7/1995 | Cheng et al. ............................. 106/802 |
| 5,634,966 | 6/1997 | Berke et al. ............................. 106/724 |
| 5,728,209 | 3/1998 | Bury et al. ............................... 106/819 |
| 5,731,367 | 3/1998 | Lee ........................................ 523/219 |

OTHER PUBLICATIONS

ASTM Designation: C 618–94A, "Standard Specification for Coal Fly Ash and Raw or Calcined Natural Pozzolan for Use as a Mineral Admixture in Portland Cement Concrete," undated, pp. 304–306. (No date available).

Huntsman Primary Surfactant Product Lines, 1995 Huntsman Corporation (one page). (No month available).

Hare, C.H., "the Evolution of Calcium Metasilicate In Paint and Coatings," *Modern Paint and Coatings,* (Nov. 1993) (8 pages).

Olin Corporation materials, "Olin Organic Chemicals," 1979 (6 pages). (No month available).

Huntsman Corporation materials, "Huntsman Products for Detergent Applications" (9 pages). (No date available).

Huntsman Corporation materials, "Non–ionic Surfactants," pp. 5–13, (No month available).

Wyman, R.A., Mines Branch Technical Bulletin TB 107, "Project No. MP–IM–R–1 The Floatability of Twenty–One Non–Metallic Minerals," 1968 (No month available) (54 pages).

Huntsman Corporation Material Safety Data Sheet for "Jeffamine T–403" issued Aug. 12, 1995 (9 pages).

Huntsman Corporation Material Safety Data Sheet for "Jeffamine ED–600" issued Aug. 12, 1995 (14 pages).

Huntsman Corporation Material Safety Data Sheet for "Jeffamine D–230" issued Jan. 31, 1996 (9 pages).

Akzo Nobel Chemicals Inc. Material Safety Data Sheet for "Duomac T" revised Sep. 19, 1995 (9 pages).

Hoechst Canada Inc. Safety Data Sheet for "TH–F Flotigam K2C" dated Jul. 9, 1993, page 1 and 3 only.

Hoechst AG DIN Safety Data Sheet for "Flotigam K2C" dated Jan., 1992 (2 pages).

Union Carbide Material Safety Data Sheet for "UCON Lubricant 50–HB–660" dated Nov. 7, 1995 (11 pages).

Low, N.M.P. et al, "The Flexural Toughness and Ductility of Portland Cement–Based Binders Reinforced with Wollastonite Micro–fibers," *Cement and Concrete Research,* vol. 24, No. 2, pp. 250–258, (1994) (No month available).

Low, N.M.P. et al, "Flexural Strength and Microstructure of Cement Binders Reinforced with Wollastonite Micro–fibers," *Cement and Concrete Research,* vol. 23, 1993, pp. 905–916. (No month available).

Low, N.M.P. et al, "Stability of Portland Cement–Based Binders Reinforced with Natural Wollastonite Micro–fibers," *Cement and Concrete Research,* vol. 24, No. 5, 1994, pp. 874–884. (No month available).

Low. N.M.P. et al, "Mechanical Properties and Microstructure of High Alumina Cement–Based Binders Reinforced with Natural Wollastonite Micro–fibers," *Cement and Concrete Research,* vol. 24, No. 4, 1994, pp. 650–660. (No month available).

Low. N.M.P. et al, "Mechanical Properties and Microstructure of Cement Binders Reinforced with Synthesized Xonotlite Micro–fibers," *Cement and Concrete Research,* vol. 23, 1993, pp. 1016–1028. (No month available).

Low, N.M.P. et al, "Mechanical Properties of High Performance Cement Binders Reinforced with Wollastonite Micro–fibers," *Cement and Concrete Research,* vol. 22, 1992, pp. 981–989. (No month Available).

Low, N.M.P. et al, "Mechanical Properties, Microstructure and Durability of Portland Cement–Based Systems containing Micro–reinforcement," *Advances in Cement and Concrete,* pp. 200–216. (No Date Available).

Gu, P. et al, "Impedance studies of wollastonite micro–fiber–reinforced cement paste systems," *Advances in Cement Research,* 1993, vol. 5, No. 18, pp. 87–92. (No month available).

Johnston, C.D., "Fiber–reinforced Cement and Concrete," *Advances in Concrete Technology* (Second Edition), (1994) pp. 603–673. (No month available).

Malhotra, V.M., "Role of Silica Fume in Concrete: A Review," *Advances in Concrete Technology,* (Second Edition), 1994, pp. 915–947. (No month available).

Neville, A., "Concrete in the year 2000," *Advances in Concrete Technology,* (Second Edition), 1994, pp. 1–17. (No Month Available).

Malhotra, V.M., "Canmet investigations dealing with high––volume fly ash concrete," *Advances in Concrete Technology* (Second Edition), 1994, pp. 445–482. (No month available).

Ramachandran, V.S., "Recent progress in the development of chemical admixtures," *Advances in Concrete Technology* (Second Edition), 1994, pp. 785–838. (No month available).

Huntsman Corporation materials entitled "Characteristics of the Jeffamine Polyoxypropyleneamines," pp. 3–11. (No date available).

Grayson, M. (editor), *Kirk–Othmer Concise Encyclopedia of Chemical Technology,* 3rd ed. New York: Wiley, 1985, pp. 350–351, 437, 928, 929, 566–568, 1142–1146. (No Month Available).

Gjorv, O.E., "High Strength Concrete," *Advances in Concrete Technology,* (Second Edition), 1994, pp. 19–92. (No month available).

SURFACE TREATED ADDITIVE FOR PORTLAND CEMENT CONCRETE

FIELD OF INVENTION

The present invention relates to an additive for incorporation into a cementitious compound comprising Portland cement and water. The invention further relates to a process for preparing the additive and a process for preparing a cementitious compound comprised of the Portland cement, water and the additive.

BACKGROUND OF INVENTION

Concrete, a cementitious compound, is known as one of the most versatile and most widely produced building materials in the world. Concrete is a gel, being a particulate strengthened ceramic-matrix composite material comprised of mortar and aggregate. Mortar is typically comprised of a hydraulic cement such as Portland cement clinker, together with water and sand. Thus, in concrete, the sand and stone become dispersed particles in a multi-phase matrix of Portland cement paste, which is comprised of the cement clinker and water.

Portland cement clinker is relatively anhydrous such that it tends to have an affinity to water. Thus, when water is added to the clinker, the clinker reacts with the water to form the cement paste. The chemical products of this reaction, which are found in the cement paste, provide strength and cohesiveness to the concrete. As time passes, the cement hydrates further, which produces more reaction products. Therefore, the strength and cohesiveness of the cementitious compound or cement typically improve with the passage of time.

It is known that although concrete is relatively strong in compression, it tends to be somewhat weaker in tension, and thus in flexion. Although increasing the amount of cement clinker or supplementary cementitious materials, as discussed below, in the concrete may improve the tensile and flexural strength, along with the compressive strength, of the concrete, this tends to be somewhat cost prohibitive and may be problematic to the maintenance of a desirable water/cement ratio. For instance, it is well known that in conventional concretes, the flexural strength tends to be about 15% or 1/7 of the compressive strength. Therefore, for every desired strength unit increase in the flexural strength (such as 1 Mpa), the compressive strength must be increased by 7 strength units (7 Mpa).

As a result, the industry has sought other approaches to reinforcing concrete in order to improve its strength, and in particular its tensile and flexural strength. One approach is to incorporate steel reinforcing bars into the concrete to provide the required tensile and flexural strength. The concrete provides both a highly alkaline environment which is compatible with the steel and a physical barrier to protect the steel from exposure to the environment.

In more recent years, the industry has also developed a number of additives which are added to, or incorporated into, the concrete in order to improve various properties of the concrete, including its tensile, flexural and compressive strength. Strength improving additives are solids which tend to be either inert, such that their mere presence in the concrete adds to its strength, or reactive, such that the additive is involved in the formation of the reaction products which give concrete its strength and other desirable properties.

Waste products, such as fly ash, blast furnace slag and condensed silica fume, are one such group of reactive strength improving additives which are often added to concrete. The addition of such waste products tends to reduce the amount of cement required in the mix to produce the concrete, which may result in a cost benefit. Further, these waste products, which otherwise have few uses, become useful and thus, there is a benefit to the environment as the waste products are incorporated into a useful produce rather than requiring disposal. However, perhaps most significantly, the properties of the concrete, and in particular its strength, tend to be significantly improved.

However, many of the additives, including the waste products noted above, are silicates which tend to be hydrophilic to varying degrees. As a result, use of these additives often requires an increase in the water content of the concrete. Further, the waste products are typically fine or very fine powders which also increases the water requirement of the concrete due to their large surface areas. Therefore, when these additives are incorporated into the concrete, a greater quantity of water must typically be added, which results in an increase in the water/cement ratio of the concrete. A minimum water/cement ratio, or a preferred range of water/cement ratios, is required to allow for proper hydration of the cement and to permit the concrete to be workable. However, preferably, any excess water is minimized as too high a water/cement ratio will decrease the strength of concrete and have other adverse effects on its properties.

The water/cement ratio (the ratio of mass of water to mass of dry cement) is one of the most important parameters in determining the properties of the hardened concrete. In theory, a water/cement ratio of approximately 0.23 is needed for complete hydration of the clinker. However, the total volume of water contained in the gel pores of the concrete increases the required water content by approximately 0.19, resulting in a theoretical total minimum water/cement ratio requirement of approximately 0.42 for complete hydration. However, in practice, and due to a number of factors, additional water is often required to produce a workable mix. The water/cement ratio required to produce a workable mix must be carefully considered in light of the known adverse effects of excess water in the concrete and high water/cement ratios.

Any excess water in the mix tends to exist in the spaces between the original cement particles and between the cement and any aggregate. These spaces do not fill completely with the gel, but rather, form a network of "capillary pores" containing water. As stated, it is desirable to add enough water to the concrete to provide for a workable mix, while minimizing the capillary pores. Thus, a balancing is required between the workability of the concrete and the detrimental effect of the capillary pores on the properties of the concrete. However, due to the natural hydrophilic properties of many additives, the problems related to the presence of capillary pores, and the problems associated with achieving the "right" balance, are typically worsened as the additives tend to require the addition of more water in order to produce a workable concrete. As the percentage of fine particle additives is increased, more water is typically required to produce a workable mixture and thus, the water/cement ratio is increased.

The balancing of the workability of the concrete mix and the water/cement ratio of the concrete mix can be assisted to some degree by the use of water reducing agents and high range water reducing agents (superplasticizers), which are typically added to the concrete mix in liquid or powder form prior to the placement of the concrete. These water reducing agents cause the components of the concrete mix temporarily to repel one another, thus reducing the water demands of the concrete mix. Unfortunately, this effect is not selective, with the result that a large proportion of the water reducing agent that is added to the concrete mix is used to produce the effect in components the concrete mix, such as coarse aggregate and sand, which do not otherwise place high water demands on the mix. Since these components typically make up a large percentage by weight of the overall mix design, it can be seen that the conventional use of water reducing agents is not an efficient way of reducing the water demands of a concrete mix. This, together with the high cost of some water reducing agents (particularly superplasticizers) and the sometimes undesirable side effects (such as retardation of curing of the concrete mix) resulting from their use demonstrates the need for an alternate means for reducing the minimum required water/cement ratio to produce a workable concrete mix.

There is therefore a need in the industry for an additive for incorporation into a cementitious compound comprising Portland cement and water, such as concrete, that improves the properties of the compound, and in particular its strength, but does not attract the disadvantages, or cause the problems, typically associated with conventional additive use (such as the need for increased water/cement ratios to produce a workable compound). In other words, the additive results in improved properties of the cementitious compound upon setting but does not substantially increase the required water/cement ratio. Specifically, there is a need for an additive for incorporation into the cementitious compound that is less attracted to the water in the compound during the placement of the compound, yet is capable of participating with the compound, during the curing of the compound, following its placement. In addition, there is a need in the industry for a process for preparing such an additive and a process for preparing a cementitious compound comprised of the Portland cement, water and the additive.

SUMMARY OF INVENTION

The present invention is directed at an additive for incorporation into a cementitious compound comprising Portland cement and water that improves the properties of the compound, such as its strength, but does not attract the disadvantages typically associated with conventional additive use, such as the need for increased water/cement ratios to produce a workable compound. In other words, the additive preferably results in improved properties of the cementitious compound upon curing but does not substantially increase the required water/cement ratio of the compound. Specifically, the invention is directed at an additive for incorporation into the cementitious compound that is treated so that it is less attracted to the water in the compound during the placement of the compound, yet is capable of participating with the compound, during the curing of the compound, following its placement. The additive may participate with the compound during curing of the compound either by reacting chemically with components of the compound or with intermediate reaction products contained in the compound, in the case of reactive additives, or by physically bonding with the compound in the case of inert additives. In addition, the invention is directed at a process for preparing the additive and a process for preparing a cementitious compound comprised of the Portland cement, water and the additive.

In a first aspect of the invention, the invention is comprised of an additive for incorporation into a cementitious compound comprising Portland cement and water prior to the setting of the compound, the additive comprising a surface treated additive wherein the surfaces of the additive are treated with a substance which has a transient hydrophobic effect on the additive, which effect temporarily renders the additive more hydrophobic for a time period following the incorporation of the additive into the compound such that the water comprising the compound is less attracted to the additive during the placement of the compound and is thus available to provide workability to the compound, and such that the additive regains its natural properties following placement of the compound in order to permit the additive to participate with the compound during the curing of the compound.

In a second aspect of the invention, the invention is comprised of a process for preparing an additive for incorporation into a cementitious compound comprising Portland cement and water prior to the setting of the compound. The process comprises the step of treating the surfaces of the additive with a substance which has a transient hydrophobic effect on the additive, which effect temporarily renders the additive more hydrophobic for a time period following the incorporation of the additive into the compound such that the water comprising the compound is less attracted to the additive during the placement of the compound and is thus available to provide workability to the compound, and such that the additive regains its natural properties following the placement of the compound in order to permit the additive to participate with the compound during the curing of the compound.

In a third aspect of the invention, the invention is comprised of a process for preparing a cementitious compound comprised of Portland cement, water and an additive comprising the steps of:

(a) treating the surfaces of the additive with a substance which has a transient hydrophobic effect on the additive to produce a surface treated additive; and (b) incorporating the surface treated additive into the Portland cement and the water in order to form the compound;

wherein the effect temporarily renders the additive more hydrophobic for a time period following the incorporation of the surface treated additive into the Portland cement and the water such that the water is less attracted to the additive during the placement of the compound and is thus available to provide workability to the compound, and such that the additive regains its natural properties following placement of the compound in order to permit the additive to participate with the Portland cement and the water during the curing of the compound.

In the first, second and third aspects of the invention, although any additive for the cementitious compound may be used, the invention is most useful and beneficial where the additive is naturally at least somewhat hydrophilic. Further, the additive may be comprised of any substance or material capable of performing the intended function of the additive, and specifically, capable of improving the properties of the cementitious compound. In the preferred embodiment, the additive is a silicate, which is defined for the purposes of the within invention as any mineral or other natural or synthetic solid substance containing silicon and which is known as a silicate.

The silicate may be comprised of a reactive material such as a supplementary cementitious material. Preferably, the supplementary cementitious material is selected from the group consisting of a pozzolan, a hydraulic material and mixtures thereof. The silicate may also be comprised of an inert material. In the preferred embodiment, the silicate is comprised of a fibrous material for reinforcing the cementitious compound. More specifically, the silicate is comprised of a calcium silicate, and is preferably comprised of a calcium metasilicate. In the preferred embodiment, the silicate is comprised of wollastonite. Further, in the preferred embodiment in which the silicate is comprised of wollastonite, the compound may be further comprised of a supplementary cementitious material selected from the group consisting of a pozzolan, a hydraulic material and mixtures thereof.

The substance may be any substance capable of surface treating the surfaces of the additive and which has a transient hydrophobic effect on the additive. Preferably, the substance is comprised of at least one organic oxide having at least three carbon atoms. The substance may also be comprised of a surfactant comprising a hydrophobic component comprising an organic oxide having at least three carbon atoms.

The substance is preferably comprised of a polymer comprising at least one alkylene oxide having at least three carbon atoms. The alkylene oxide is preferably comprised of propylene oxide, and the polymer may be further comprised of ethylene oxide. In the preferred embodiment, the polymer is comprised of alkylene glycol, alkyl ether amine, oxyalkyleneamine or oxypropylenediamine. The polymer may also be comprised of a mixture of any of these chemicals.

The substance surface treats the additive so as to impart a transient hydrophobic effect on the additive. Preferably, the substance coats the additive but does not chemically bond to or otherwise chemically react with it. As a result, the transient hydrophobic effect only temporarily renders the additive more hydrophobic for a time period following the incorporation of the additive into the compound.

Finally, any amount of the substance capable of effectively treating, or coating, the surfaces of the additive to achieve the transient hydrophobic effect may be used. The minimum amount of substance required will depend upon the substance, upon the nature of the particular additive and upon the fineness and shape of the additive. However, in the preferred embodiment, the additive is treated with an amount of the substance such that the resulting surface treated additive is comprised of between about two to five percent by weight of the substance.

DETAILED DESCRIPTION

The present invention is comprised of an additive for incorporation into a cementitious compound, comprised of Portland cement and water, prior to the setting of the compound. The Portland cement and water are typically mixed to produce a cement paste. Further, the cement paste is typically mixed with sand to produce mortar, and is further mixed with aggregate (such as rock, stone or gravel) to produce concrete. Thus, in the within invention, the cementitious compound may be cement paste, mortar, concrete or any other compound including Portland cement and water. However, the cementitious compound is preferably concrete.

Concrete is a particulate strengthened ceramic-matrix composite material. The sand and aggregate comprise the dispersed particles in a multiphase matrix of the cement paste. The concrete, as well as all of the cementitious compound, are gels, being intimate mixtures of solid hydrates and interlayer water contained in water filled spaces referred to as interlayer spaces or gel pores. Typically, the gel pores of the cementitious compound are substantially filled with a highly alkaline solution having a pH of between about 12.6 and 13.8.

For the purposes of the within invention, the term "Portland cement" includes what is commonly known as Portland cement clinker, as well as any other hydraulic cements which exhibit properties similar to those of Portland cement clinker. Typically, Portland cement clinker includes several anhydrous oxides, primarily tricalcium silicate ($C_3S$) and dicalcium silicate ($C_2S$) with lesser amounts of tricalcium aluminate ($C_3A$) and calcium alumino-ferrite ($C_4AF$). The clinker may also include small amounts of magnesium, sodium, potassium and sulphur compounds.

Upon mixing the cement clinker with water to form the cement paste, the clinker hydrates. As hydration proceeds, the microstructure progressively changes from unhydrated cement clinker, air and water to produce a porous matrix of hydration reaction products referred to as the gel. The hydration of the clinker produces a cement paste comprised of several reaction products. The cement paste is primarily comprised of calcium-silicate-hydrate. The calcium-silicate-hydrate is primarily responsible for the strength of the paste and its cementing properties. The cement paste is also comprised of calcium hydroxide and other reaction products, which do not significantly contribute to the strength of the cement paste. The hydration process, and the formation of the reaction products, which is known as "curing", starts upon the addition of water to the clinker and may not reach completion for many years, or at all.

The additive is incorporated into the cementitious compound prior to the setting of the compound. Prior to reaching a hardened state, the cementitious compound undergoes a gradual stiffening associated with the hydration reactions or products in the cement paste. This process is referred to as "setting."

In the present invention, the additive which is incorporated into the cementitious compound is a solid material which is surface treated with a substance which has a transient hydrophobic effect on the additive. The specific additive may be any additive which may be added to a cementitious compound in order to improve or enhance one or more properties or characteristics of the cementitious compound. The additive may even be Portland cement clinker. In the preferred embodiment, an additive is selected which will enhance or increase the strength of the cementitious compound, and preferably its tensile or flexural strength. Since the present invention is directed at rendering the additive temporarily more hydrophobic, the invention is most useful and beneficial where the additive is naturally at least somewhat hydrophilic, and may not be necessary where the additive is naturally somewhat hydrophobic.

Preferably, the additive is comprised of a silicate having a naturally somewhat hydrophilic nature. For the purposes of the within invention, the term "silicate" comprises any mineral or other natural or synthetic solid substance which contains silicon and which is known as a silicate.

The silicate may comprise a reactive material such as a supplementary cementitious material. Supplementary cementitious materials are materials which either react with the products of the cement hydration reactions or which are hydraulic materials themselves. In other words, supplementary cementitious materials are reactive additives. Supplementary cementitious materials consist of two groups of materials: pozzolans and hydraulic materials. Thus, in the within invention, the supplementary cementitious materials may be selected from the group consisting of a pozzolan, a hydraulic material and mixtures thereof. Without surface treatment of the supplementary cementitious materials in accordance with the within invention, incorporation of these materials into the cementitious compound typically requires the addition of further water to the cementitious compound in order for it to be workable and may often result in the problems associated therewith.

Pozzolans are siliceous or siliceous and aluminous materials which possess little or no cementitious value themselves. However, they react with the reaction products of the cement hydration. More specifically, pozzolans tend to react with the calcium hydroxide ($Ca(OH)_2$), which contributes no significant strength to the cementitious compound, to produce further calcium-silicate-hydrate which does significantly contribute to the strength and cohesion of the cementitious compound. As the pozzolans contribute to the strength and cohesion of the cementitious compound, the amount of cement in the cementitious compound may be reduced. Further, pozzolans tend to be waste products in the form of a fine powder. For instance, pozzolans include volcanic ash, fly ash (the waste produced from burning coal such as in coal-fired power plants) and silica fume (the waste from the production of silicon or various silicon alloys).

Hydraulic materials tend to react with the water directly to produce further calcium-silicate-hydrate, which significantly contributes to the strength and cohesion of the cementitious compound. As the hydraulic materials contribute to the strength and cohesion of the cementitious compound, the amount of cement in the cementitious compound may be reduced. Hydraulic materials include Portland cement, but otherwise tend to be waste products in the form of a fine powder. For instance, hydraulic materials include blast furnace slag (the waste from the production of pig iron).

Each of the supplementary cementitious materials is preferably incorporated into the cementitious compound by either adding it to the cement paste or mixing it into the Portland cement, in order to partially replace the Portland cement, prior to adding water to produce the cement paste. Since these supplementary cementitious materials are generally waste products which require disposal, in addition to enhancing or improving the properties of the cementitious compound, their incorporation into the cementitious compound also provides environmental benefits.

The silicate may also comprise a substantially inert material such as conventional coarse and fine concrete aggregate, tripoli (which may also exhibit pozzolanic or hydraulic properties and may thus be reactive), quartzite and other natural or synthetic minerals or substances containing silicon, each of which may be incorporated into the cementitious compound by either adding it to the cement paste or mixing it with the Portland cement prior to adding water to produce the cement paste.

Preferably, the silicate is comprised of a substantially inert fibrous material, for reinforcing the cementitious compound and for improving its flexural strength. The fibrous material is preferably comprised of discrete fibers, compatible with the moist alkaline environment of the cement paste. These fibres are incorporated into the cementitious compound such that the fibers may increase the strength of the cementitious compound. As stated, these fibers tend to be primarily or substantially inert in that they do not chemically react with the other components of the cementitious compound. Rather, the improved properties of the cementitious compound, and in particular its flexural strength, are a direct result of the presence of the fibers in the compound. Thus, the specific effect of any fibrous material on the properties of the cementitious compound will tend to be dependent upon one or more of the natural properties of the particular fibers, the fiber content (percentage by volume of the cementitious compound) and the manner of incorporation of the fibrous material into the cementitious compound.

The fibrous material may be incorporated into the cementitious compound at any stage prior to setting of the compound or it may be pre-mixed with the Portland cement. Preferably, the additive is incorporated into the compound so that the fiber orientation is substantially random in three dimensions so that the reinforcing effectiveness is the same in all directions. The fibrous material may be incorporated into the cementitious compound in any manner or by any process.

The fibrous material is preferably comprised of a calcium silicate, and is more preferably comprised of a calcium metasilicate. In the preferred embodiment, the calcium metasilicate is comprised of wollastonite, a naturally occurring mineral.

Wollastonite is a member of the pyroxenoid mineral group. Pure wollastonite, having the chemical formula $CaSiO_3$, typically has a composition of 48.3% $CaO$ and 51.7% $SiO_2$. However, wollastonite is rarely found in its pure form and iron, magnesium, manganese or strontium may substitute for some of the calcium. Wollastonite is substantially chemically inert and has a naturally high pH. The inertness of wollastonite and its unique acicularity make wollastonite particularly useful as a reinforcing material in cementitious compounds.

Due to its unique cleavage properties, wollastonite breaks down during crushing and grinding into lathe- or splinter-like or needle-shaped fibers or particles of varying acicularity. The acicularity of the fibers or particles is defined by their length:width, or length:diameter, ratio (known as the aspect ratio). Fibers having any size and aspect ratio may be used in the within invention. However, it has been found that the best results in terms of improved flexural strength of the cementitious compound are achieved by minimizing the size of the wollastonite fibers and by maximizing their aspect ratio. For example, a cementitious compound containing wollastonite fibers having a mean by weight width of 40 microns has been found to exhibit better flexural strength properties than a cementitious compound containing wollastonite fibers having a mean by weight width of 100 microns. Furthermore, wollastonite that is crushed to smaller sizes during preparation tends to facilitate greater separation of wollastonite fibers from gangue material, thus leading to more effective purification of the wollastonite. Based upon economic considerations, it has been found that for some wollastonite deposits, the optimum mean by weight width of the wollastonite fibers is about 75 microns, since wollastonite fibers crushed to this size can typically be separated relatively efficiently from gangue material and can be crushed to this size relatively economically. This optimum width may, however, vary depending upon the source of the wollastonite deposit, since every deposit of wollastonite may exhibit different characteristics. For best results, care should be taken in crushing the wollastonite to its desired size to preserve as high an aspect ratio as is possible, in order to enhance the fiber reinforcement properties of the wollastonite in the cementitious compound.

It as been found that by incorporating wollastonite into a cementitious compound in the manner as provided for in the present invention, the flexural strength of the cementitious compound can be improved, and particularly the long term flexural strength. In particular, some tests have shown that the flexural strength of a cementitious compound containing surface treated wollastonite is superior to the flexural strength of a cementitious compound containing non-surface treated wollastonite, even where water reducing agents are used in both mixes. Some tests have also shown that when wollastonite is used in combination with an amount of supplementary cementitious material, such as fly ash, the flexural strength of the cementitious compound may be substantially increased (without requiring the corresponding increase in the compressive strength previously discussed) above that which can be achieved by a compound containing surface treated wollastonite but not containing supplementary cementitious material. In particular, some test results have shown a potential for cementitious compounds containing surface treated wollastonite and non-surface treated fly ash to produce increases of up to 30 percent and higher in long-term flexural strength as compared to cementitious compounds not including any strengthening additives or as compared to cementitious compounds including supplementary cementitious materials only. Although this improved flexural strength has been achieved by surface treating only the wollastonite and not the supplementary cementitious material, even more beneficial results may be possible by surface treating both the wollastonite and the supplementary cementitious material in accordance with the within invention. The combination of wollastonite and a supplementary cementitious material has also been found in some cases to improve the finishability of the cementitious compound.

As stated, the additive is surface treated. Specifically, the surfaces of the additive are treated with a substance which has a transient hydrophobic effect on the additive. Thus, the substance is specifically selected or chosen to have the transient hydrophobic affect on the particular additive being treated. In other words, the additive and the substance must be compatible, in that, the selected substance must be capable of causing the transient hydrophobic effect on the selected additive upon treatment of the surfaces of the additive.

If the additive is naturally hydrophilic, the transient hydrophobic effect of the substance is intended to temporarily render the additive more hydrophobic such that its affinity to water is lessened or decreased. The additive need not be rendered fully hydrophobic, such that it has no affinity to water at all, as long as it is rendered more hydrophobic than it is in its natural state. However, it is preferable that the surface treated additive have a significant or substantial degree of hydrophobicity. As the effect is intended to be temporary, substances which permanently alter the natural hydrophilicity of the additive should not be used in the within invention. In essence, once a period of time has passed, the additive must be able to regain its natural properties, including its natural hydrophilic nature.

Both the specific substance and the amount of the substance used to treat the additive are selected to temporarily render the additive more hydrophobic for a period of time following the incorporation of the additive into the cementitious compound. The greater the amount of the substance that is used to treat the additive, the longer the period of time before the transient hydrophobic effect wears off. The necessary time period will depend upon the amount of time which is required or desirable to permit the proper mixing and placement of the cementitious compound. In other words, the time period should provide an adequate period during which the cementitious compound will be workable. During the time period that the additive is temporarily rendered more hydrophobic, the water comprising the cementitious compound is less attracted to the additive. Preferably this effect will exist during the placement of the cementitious compound, but will begin to diminish shortly thereafter in order to enable the additive to regain its natural properties and begin to participate in the curing of the compound as soon as possible.

The participation of the additive with the cementitious compound during the curing of the compound, may be by any manner, mode or process by which the additive contributes in any fashion to the properties of the cementitious compound. However, typically, the additive will be either reactive or inert. If the additive is reactive, it will typically participate with the cementitious compound during the curing of the compound by reacting with either the water comprising the compound or with the reaction products produced or formed by previous reactions between the Portland cement and the water, in order to form further reaction products. If the additive is inert, its participation with the cementitious compound during the setting of the compound will typically be limited to providing a further component or element to the cementitious compound, such as a reinforcing material, so that the cementitious compound sets and hardens about the additive. The presence of the inert additive alone contributes to the properties of the compound.

The additive may be surface treated with the substance in any manner by using any process or method for surface treatment compatible with both the specific treating substance and the additive being treated. However, preferably, the substance treats the additive by coating its surfaces but it does not chemically bond to or otherwise chemically react with the additive. The coating of the substance may be applied to the surfaces of the additive by any compatible process or method able to spread an effective layer of the substance over substantially all of the surfaces.

A substance which chemically bonds to the additive may be used only where the chemical bonding is temporary such that it is reversible or the chemical bonding does not otherwise interfere with the transient hydrophobic effect. However, chemical bonding of the substance to the additive may render the additive permanently hydrophobic, thus neutralizing the long term beneficial effects of the additive in the concrete by not permitting the additive to participate with the compound during its curing. As a result, substances which chemically bond to the additive are generally not compatible for use in the within invention. This effect is believed to have been exhibited where certain oxysilanes have been tested for use as a potential substance for surface treating of the additive, with the result that substances containing oxysilane groups may not be suitable for use in the within invention. A substance which otherwise chemically reacts with the additive may either cause breakdown or deterioration of the additive or may also render the additive permanently hydrophobic, and may therefore also not be compatible for use in the within invention.

The transient nature of the hydrophobic effect of the substance may be achieved by any mechanism or chemical reaction. For instance, the substance may break down or decompose in some manner over time such that the decomposed elements of the substance are no longer able to maintain the hydrophobic effect and therefore the hydrophobic effect of the substance ceases. Alternately, the substance may simply release itself from the surfaces of the additive in some manner over time, such that the additive is no longer coated with the substance and the substance no longer has a hydrophobic effect on the additive. In either case, the decomposition or release may be caused, enhanced or facilitated by the alkaline environment or nature of the cementitious compound. For example, in the case of substances consisting of polymers comprising propylene oxide, it is theorized that the severe alkaline environment of the cement gel causes the polymer to become insoluble and thus release from the additive, leaving the additive uncoated by the polymer.

The minimum amount of the substance required to treat the additive is an amount which is able to achieve or produce the desired transient hydrophobic effect on that particular additive. In other words, an amount is required which is able to effectively treat substantially all of the surfaces of the additive. The use of an excess amount of substance, or an amount substantially greater than the required minimum amount, should be avoided in order to minimize the cost of the surface treatment and in order to minimize the time period before which the hydrophobic effect on the additive wears off.

In the preferred embodiment, an amount of the substance is used to produce a surface treated additive comprised of between about two to five percent by weight of the substance. An amount of less than 2% by weight of the substance may be ineffective to achieve the transient hydrophobic effect, while an amount greater than 5% by weight may adversely impact upon the short term strength of the cementitious compound, and may render the additive more difficult to handle before it is incorporated into the cementitious compound. The actual minimum amount of substance required will depend upon the nature and properties of the substance and the additive and upon the fineness and shape of the additive. Preferably, the maximum amount of the substance used should be such that a surface treated additive is similar to an untreated additive in both appearance and in handling characteristics.

The substance is preferably comprised of one or more organic substances, and in particular, is preferably comprised of at least one organic oxide having at least three carbon atoms. Typically, it has been found that organic oxides having less than three carbon atoms tend to be more hydrophilic than hydrophobic in nature because of the relatively larger proportion of hydrophilic oxygen included in these oxides. Higher organic oxides, having three or more carbon atoms, contain a proportionately small amount of oxygen and therefore tend to be more hydrophobic than hydrophilic in nature. Thus, substances containing only organic oxides having less than three carbon atoms tend to be unsuitable for use as the substance in the within invention due to their hydrophilic nature. However, the substance may also comprise a surface active agent, or surfactant, having both a hydrophobic component and a hydrophilic component. In such case, the hydrophobic component is preferably comprised of an organic oxide having at least three carbon atoms, while the hydrophilic component may comprise any hydrophilic component or moiety such as carboxylates, phosphates, sulfonates, sulfates, alcohols, glycols, amines, polyamines or organic oxides having fewer than three carbon atoms.

The organic oxide having at least three carbon atoms may be derived from saturated, unsaturated or aromatic hydrocarbons or may be derived from derivatives therefrom. However, the substance must also be capable of imparting a transient hydrophobic effect on the additive. Consequently, some organic oxides may be unsuitable for the intended function because they are unable to achieve the desired effect. For example, and as indicated above, it has been found that oxysilanes appear to render the additive permanently hydrophobic. As a result, an oxysilane treated additive and, in particular, oxysilane treated wollastonite, has a low water demand but appears to provide no long term increase in the flexural strength of the cementitious compound given that the wollastonite is unable to regain its natural properties, including its hydrophilicity. Therefore, organic oxides containing oxysilane groups may not be suitable for use as the substance. Other organic oxides may be unsuitable for similar reasons.

Although some of the higher organic oxides may themselves have a high enough molecular weight to comprise the substance, the substance is preferably comprised of a polymer in order to provide a molecular weight for the substance which is high enough to facilitate economical and effective surface treatment of the additive. In the preferred embodiment, the substance is a polymer comprised of propylene oxide units. Further, in preferred embodiment, the polymer is a surfactant further comprising an organic oxide having fewer than three carbon atoms, such as ethylene oxide units, or a surfactant further comprising an amine, a polyamine or a glycol.

In the preferred embodiment in which the additive is comprised of wollastonite, the polymer is preferably comprised of at least one of the four polymers described below, including mixtures thereof.

First, the substance may be comprised of a polymer of alkylene glycol. The chemical composition of polyalkylene glycol is polyalkylene glycol monobutyl ether which has the following chemical formula:

$$C_4H_9(OCH_2CH_2)x[OCH_2CH(CH_3)]yOH$$

This polymer is manufactured by Union Carbide Canada Inc. and is commercially available under the UCON trademark as UCON Lubricant 50-HB-660.

Second, the substance may be comprised of a polymer of alkyl ether amine. The chemical composition of polyalkyl ether amine is as follows:

poly(oxy(methyl-1, 2-ethanediyl)), alpha-hydro-omega-(2-aminomethylethoxy)-,ether with 2-ethyl-2-(hydroxymethyl)-1,3-propanediol (3:1)

This polymer is manufactured by Huntsman and is commercially available under the JEFFAMINE trade-mark as JEFFAMINE T-403.

Third, the substance may be comprised of a polymer of oxyalkyleneamine. The chemical composition of polyoxyalkyleneamine is:

oxirane, methyl-, polymer with oxirane, bis (2-aminopropyl) ether

This polymer is manufactured by Huntsman and is commercially available under the JEFFAMINE trade-mark as JEFFAMINE ED-600.

Fourth, the substance may be comprised of a polymer of oxypropylenediamine. The chemical composition of polyoxypropylenediamine is:

poly (oxy(methyl 1-1,2-ethanediyl)), alpha-(2-aminomethylethyl)omega-(2-aminomethylethoxy)

This polymer is also manufactured by Huntsman and is commercially available under the JEFFAMINE trade-mark as JEFFAMINE D-230.

In JEFFAMINE polymers, the letter associated with the JEFFAMINE trademark (D or T) represents the functionality (di- or tri-) of a given product, while the number designates the approximate average molecular weight. Thus, for example, D-230 represents a diamine of about 230 molecular weight.

Any other substances that are capable of producing the transient hydrophobic effect described above may be used as the surface treating substance. Such other substances may include polymers comprising only propylene oxide units, polymers or other substances comprising other organic oxides comprising at least three carbon atoms, or surfactants comprising propylene oxide or other organic oxides having at least three carbon atoms as the hydrophobic component and comprising carboxylates, phosphates, sulfonates, sulfates, alcohols, glycols, amines, polyamines, organic oxides having fewer than three carbon atoms or other hydrophilic moieties as the hydrophilic component.

It should be understood that the exact nature of the chemistry involved in this invention is not completely known. Therefore the practice of this invention is not to be taken as being limited by the theories contained herein.

The following Example serves to more fully illustrate the invention. In the Example, the following parameters for mix design are constant:

| 1. | sand content- | 956 | grams |
|---|---|---|---|
| 2. | coarse aggregate-content | none | |
| 3. | fly ash content- | 119 | grams |
| 4. | cement content- | 306 | grams |
| 5. | wollastonite- (where present) | 42.5 | grams |
| 6. | air entraining-admixture | 0.5 | millilitres |

| | Control Mix (no wollastonite) | Untreated wollastonite | Wollastonite treated with 5% Jeffamine D-230 | Wollastonite treated with 5% Jeffamine T-403 | Wollastonite treated with 5% Jeffamine ED-600 | Wollastonite treated with 5% UCON 50-HB-660 |
|---|---|---|---|---|---|---|
| Air content (%) | 7% | 7% | 7% | 7% | 7% | 7% |
| Flow (%) | 124% | 129% | 124% | 126% | 125% | 131% |
| Water/Cement ratio (W/C) | 0.37 | 0.42 | 0.40 | 0.39 | 0.39 | 0.39 |

-continued

|  | Control Mix (no wollastonite) | Untreated wollastonite | Wollastonite treated with 5% Jeffamine D-230 | Wollastonite treated with 5% Jeffamine T-403 | Wollastonite treated with 5% Jeffamine ED-600 | Wollastonite treated with 5% UCON 50-HB-660 |
|---|---|---|---|---|---|---|
| Water reducing agent dosage | 1.91 ml | 1.91 ml | 1.91 ml | 1.91 ml | 1.91 ml | 2.13 ml |
| Superplasticizer dosage | 2.51 ml | 2.51 ml | 2.51 ml | 2.51 ml | 2.51 ml | 2.98 ml |
| 7-day compressive strength (MPa) | 31.8 | 28.4 | 30.2 | 32.7 | 31.9 | 29.3 |
| 28-day compressive strength (MPa) | 48.3 | 41.4 | 46.2 | 52.6 | 52.0 | 43.2 |
| 7-day flexural strength (kg force) | 30.9 | 31.8 | 35.0 | 35.9 | 33.2 | 34.5 |
| 28-day flexural strength (kg force) | 36.8 | 39.1 | 49.1 | 47.7 | 49.1 | 44.1 |

NOTES:
- The wollastonite is an HAR-200 (high aspect ratio, 200 mesh × 0) grade wollastonite produced by Minera NYCO S.A. de C.V. of Mexico
- The air entraining admixture is Daravair (TM), produced by W. R. Grace and Co.
- The water reducing agent is WRDA (TM), manufactured by W. R. Grace and Co.
- The superplasticizer is WRDA-19 (TM), manufactured by W. R. Grace and Co.
- The samples tested for flexural strength are beams measuring 12.7 mm × 19.1 mm × 152.4 mm The embodiments of the invention in which an exclusive privilege or property is claimed are defined as follows:

1. A process for improving the flexural strength of a cementitious composition comprising Portland cement and water by incorporating therein prior to the setting of the cementitious composition a sufficient amount of an additive consisting essentially of wollastonite that has been surface treated with at least one polymeric surfactant containing a hydrophobic component comprising propylene oxide units and a hydrophilic component positioned at one or more ends of the polymer to thereby improve the flexural strength of the cementitious composition.

2. The process of claim 1, wherein the polymer comprises a copolymer containing propylene oxide units and the ethylene oxide units.

3. The process of claim 2, wherein the hydrophilic component of the polymer comprises an amine group positioned at one or more ends of the polymer.

4. The process of claim 3, wherein the polymer is a polyoxyalkyleneamine and wherein the hydrophilic component of the polymer comprises two amine groups positioned at two ends of the polymer.

5. The process of claim 2, wherein the hydrophilic component of the polymer comprises a hydroxyl group positioned at one or more ends of the polymer.

6. The process of claim 5, wherein the polymer is a polyalkylene glycol and wherein the hydrophilic component comprises one hydroxyl group positioned at one end of the polymer.

7. The process of claim 1, wherein the polymer is a polyoxypropyleneamine and wherein the hydrophilic component comprises an amine group positioned at one or more ends of the polymer.

8. The process of claim 7, wherein the polymer is a polyalkyl ether amine and wherein the hydrophilic component of the polymer comprises three amine groups positioned at three ends of the polymer.

9. The process of claim 7, wherein the polymer is a polyoxypropylenediamine and wherein the hydrophilic component of the polymer comprises two amine groups positioned at two ends of the polymer.

10. The process of claim 1, wherein the polymer does not comprise oxysilane groups.

11. The process of claim 1, wherein the surface treated additive composition comprises about two to five percent by weight of the polymer.

12. The process of claim 1, wherein the polymer is selected from the group consisting of polyalkylene glycol monobutyl ether, polyalkyl ether amine, polyoxyalkylene amine and polyoxypropylene diamine.

13. The process of claim 12, wherein the polymer is polyalkylene glycol monobutyl ether.

14. The process of claim 12, wherein the polymer is polyalkyl ether amine.

15. The process of claim 12, wherein the polymer is polyoxyalkylene amine.

16. The process of claim 12, wherein the polymer is polyoxypropylene diamine.

17. A cementitious composition with improved flexural strength comprising the reaction product of Portland cement, water and a sufficient amount of an additive consisting essentially of wollastonite that has been surface treated with at least one polymeric surfactant containing a hydrophobic component comprising propylene oxide units and a hydrophilic component positioned at one or more ends of the polymer to thereby improve the flexural strength of the cementitious composition.

18. The composition of claim 17, wherein the polymer comprises a copolymer containing propylene oxide units and ethylene oxide units.

19. The composition of claim 18, wherein the hydrophilic component of the polymer comprises an amine group positioned at one or more ends of the polymer.

20. The composition of claim 19, wherein the polymer is a polyoxyalkyleneamine and wherein the hydrophilic component of the polymer comprises two amine groups positioned at two ends of the polymer.

21. The composition of claim 18, wherein the hydrophilic component of the polymer comprises a hydroxyl group positioned at one or more ends of the polymer.

22. The composition of claim 21, wherein the polymer is a polyalkylene glycol and wherein the hydrophilic component comprises one hydroxyl group positioned at one end of the polymer.

23. The composition of claim 17, wherein the polymer is a polyoxypropyleneamine and wherein the hydrophilic component comprises an amine group positioned at one or more ends of the polymer.

24. The composition of claim 23, wherein the polymer is a polyalkyl ether amine and wherein the hydrophilic component of the polymer comprises three amine groups positioned at three ends of the polymer.

25. The composition of claim 23, wherein the polymer is a polyoxypropylenediamine and wherein the hydrophilic component of the polymer comprises two amine groups positioned at two ends of the polymer.

26. The composition of claim 17, wherein the polymer does not comprise oxysilane groups.

27. The composition of claim 17, wherein the surface treated additive composition comprises bout two to five percent by weight of the polymer.

28. The composition of claim 17, wherein the polymer is selected from the group consisting of polyalkylene glycol monobutyl ether, polyalkyl ether amine, polyoxyalkylene amine and polyoxypropylene diamine.

29. The composition of claim 28, wherein the polymer is polyalkylene glycol monobutyl ether.

30. The composition of claim 28, wherein the polymer is polyalkyl ether amine.

31. The composition of claim 28, wherein the polymer is polyoxyalkylene amine.

32. The composition of claim 28, wherein the polymer is polyoxypropylene diamine.

\* \* \* \* \*

UNITED STATES PATENT AND TRADEMARK OFFICE
CERTIFICATE OF CORRECTION

PATENT NO. : 5,948,157
DATED : September 7, 1999
INVENTOR(S) : Colin J. McKenny, et. al.

It is certified that error appears in the above-identified patent and that said Letters Patent is hereby corrected as shown below:

Title page, item [19] and
Title page, item [75], inventors: change "McKenney" to --McKenny--.

Column 18, line 15 (claim 27), change "bout" to --about--.

Signed and Sealed this

Twenty-fifth Day of July, 2000

Attest:

Q. TODD DICKINSON

Attesting Officer

Director of Patents and Trademarks